United States Patent
Fukuda et al.

(10) Patent No.: US 8,440,246 B2
(45) Date of Patent: May 14, 2013

(54) BEVERAGE PACKED IN CONTAINER

(75) Inventors: Masahiro Fukuda, Sumida-ku (JP); Hirokazu Takahashi, Sumida-ku (JP); Ryo Kusaka, Sumida-ku (JP); Eri Itaya, Sumida-ku (JP)

(73) Assignee: Kao Corporation, Tokyo (JP)

( * ) Notice: Subject to any disclaimer, the term of this patent is extended or adjusted under 35 U.S.C. 154(b) by 341 days.

(21) Appl. No.: 12/521,660

(22) PCT Filed: Dec. 26, 2007

(86) PCT No.: PCT/JP2007/001468
§ 371 (c)(1),
(2), (4) Date: Jun. 29, 2009

(87) PCT Pub. No.: WO2008/081583
PCT Pub. Date: Jul. 10, 2008

(65) Prior Publication Data
US 2010/0316770 A1    Dec. 16, 2010

(30) Foreign Application Priority Data

Dec. 27, 2006  (JP) ................................ 2006-353185
Dec. 25, 2007  (JP) ................................ 2007-331578

(51) Int. Cl.
A23L 2/52   (2006.01)
(52) U.S. Cl.
USPC ........ 426/597; 426/271; 426/330.3; 426/425; 426/435; 426/479
(58) Field of Classification Search .................. 426/271, 426/330.3, 425, 435, 479, 597
See application file for complete search history.

(56) References Cited

U.S. PATENT DOCUMENTS

| | | | |
|---|---|---|---|
| 5,424,082 A | 6/1995 | Dake et al. | |
| 5,879,733 A * | 3/1999 | Ekanayake et al. | ........... 426/271 |
| 6,616,955 B2 | 9/2003 | Nunes et al. | |
| 2002/0187219 A1 | 12/2002 | Yang et al. | |
| 2003/0082273 A1 | 5/2003 | Iwasaki et al. | |
| 2005/0003068 A1 | 1/2005 | Kester et al. | |
| 2005/0095343 A1 | 5/2005 | Ogura et al. | |
| 2006/0096547 A1 | 5/2006 | Massey et al. | |
| 2006/0099318 A1 | 5/2006 | Iwasaki et al. | |
| 2006/0177559 A1 | 8/2006 | Gosselin et al. | |
| 2007/0092624 A1 | 4/2007 | Iwasaki et al. | |
| 2007/0128327 A1* | 6/2007 | Takashima et al. | ........... 426/597 |
| 2007/0141219 A1 | 6/2007 | Iwasaki et al. | |

FOREIGN PATENT DOCUMENTS

| | | |
|---|---|---|
| JP | 3-168046 | 7/1991 |
| JP | 7-327648 | 12/1995 |
| JP | 8-501449 | 2/1996 |
| JP | 10-004919 | 1/1998 |
| JP | 2001-197863 | 7/2001 |
| JP | 2002-238518 | 8/2002 |
| JP | 2003 169641 | 6/2003 |
| JP | 2003 333989 | 11/2003 |
| JP | 2004-129662 | 4/2004 |
| JP | 2004-129670 A | 4/2004 |
| JP | 2004-159641 | 6/2004 |
| JP | 2005 58208 | 3/2005 |
| JP | 2005 58210 | 3/2005 |
| JP | 2005 58211 | 3/2005 |
| JP | 2006 122004 | 5/2006 |
| JP | 2006 129738 | 5/2006 |
| JP | 2006-160656 A | 6/2006 |
| JP | 2007-151467 | 6/2007 |
| JP | 2007-521010 | 8/2007 |
| WO | WO 94/06412 | 3/1994 |
| WO | WO 2005/053415 A1 | 6/2005 |

OTHER PUBLICATIONS

"Drinks That Eat Teeth" 2000. http://www.21stcenturydental.com/smith/pH_drinks.htm.*
Japanese Official Notice issued Jan. 31, 2012, in Patent Application No. 2007-331578 (with English-language translation).
Chinese Office Action issued Jan. 31, 2012, in Patent Application No. 200780048362.6 (with English-language translation).
Office Action issued Oct. 23, 2012 in Japanese Patent Application No. 2007-331578 with English language translation.
Decision of Refusal issued Mar. 5, 2013 in corresponding Japanese Patent Application No. 2007-331578, with English Translation, 8 pp.

* cited by examiner

*Primary Examiner* — Anthony Weier
(74) *Attorney, Agent, or Firm* — Oblon, Spivak, McClelland, Maier & Neustadt, L.L.P.

(57) ABSTRACT

By containing non-polymer catechins in high concentration, the physiological effects of the catechins are manifested, minerals indispensable to the living body are fortified, and the storage stability of a beverage is improved. A packaged beverage containing: (A) from 0.05 to 0.5% by mass of non-polymer catechins; (B) from 0.0012 to 0.12% by mass of calcium; (C) from 0.00012 to 0.006% by mass of magnesium; (D) from 0.000048 to 0.0024% by mass of zinc; (E) from 0.00004 to 0.002% by mass of iron; and (F) from 0.01 to 20% by mass of a sweetener, wherein a content mass ratio [(B)/(A)] of the calcium (B) to the non-polymer catechins (A) is from 0.001 to 1.0; (J) a percentage of gallate bodies in the non-polymer catechins is from 5 to 55% by mass; and pH is from 2.5 to 5.1.

18 Claims, No Drawings

BEVERAGE PACKED IN CONTAINER

FIELD OF THE INVENTION

This invention relates to a packaged beverage containing non-polymer catechins in high concentration.

BACKGROUND OF THE INVENTION

Catechins are reported to have the ability to suppress an increase in cholesterol, an inhibitory action on amylase-activity, and the like (see Patent Documents 1 and 2). For such physiological effects to manifest, it is necessary for an adult to drink 4 to 5 cups of tea a day. Hence there has been a strong demand for a technology that enables a beverage to contain a high concentration of catechins so that a large amount of catechins can be conveniently ingested. As one of such technologies, there is a method that is designed to add dissolved catechins to a beverage by using a purified product of green tea extract (see Patent Documents 3 to 5) or the like.

Meanwhile, more beverages have been reported so far, such as a beverage fortified with calcium as a nutrient necessary for the body and a beverage containing minerals such as calcium, magnesium, zinc and iron mixed therein and a beverage containing catechins and minerals. Even more, beverages, which contain a tea extract and caffeine and are fortified with vitamin B, have been reported by other documents (see Patent Documents 6 to 12).

[Patent Document 1] JP-A-03-168046
[Patent Document 2] JP-A-10-004919
[Patent Document 3] JP-A-2002-238518
[Patent Document 4] JP-A-2004-129662
[Patent Document 5] JP-A-2004-159641
[Patent Document 6] JP-A-07-327648
[Patent Document 7] JP-A-08-501449
[Patent Document 8] U.S. Pat. No. 6,616,955
[Patent Document 9] US-A-2005/0003068
[Patent Document 10] US-A-2006/0177559
[Patent Document 11] US-A-2006/0096547
[Patent Document 12] US-A-2002/0187219

DISCLOSURE OF THE INVENTION

The present invention provides a packaged beverage containing:
(A) from 0.05 to 0.5% by mass of non-polymer catechins;
(B) from 0.0012 to 0.12 by mass of calcium;
(C) from 0.00012 to 0.006% by mass of magnesium;
(D) from 0.000048 to 0.0024% by mass of zinc;
(E) from 0.00004 to 0.002% by mass of iron; and
(F) from 0.01 to 20% by mass of a sweetener,
wherein a content mass ratio [(B)/(A)] of the calcium (B) to the non-polymer catechins (A) is from 0.001 to 1.0, (J) a percentage of gallate bodies in the non-polymer catechins is from 5 to 55% by mass, and pH is from 2.5 to 5.1.

MODES FOR CARRYING OUT THE INVENTION

The present invention is to provide a packaged beverage that is capable of exerting the physiological effects of catechins by containing a high concentration of non-polymer catechins, is fortified with minerals vital to the living body, and has good storage stability.

The present inventors studied a beverage containing non-polymer catechins in high concentration and a sweetener. And it has been found that the storage stability of the beverage improves dramatically by controlling the percentage of gallate bodies in the non-polymer catechins and pH, and that a packaged beverage having the inherent taste of a beverage can be obtained by further containing minerals and a sweetener. The present inventors have also found that the taste stability of the beverage grows more excellent by controlling the percentage of non-epi-bodies in non-polymer catechins.

According to the present invention, it is possible to provide a packaged beverage that contains non-polymer catechins in high concentration, is fortified with minerals vital to the living body, and has reduced bitterness and improved storage stability.

The term "(A) non-polymer catechins" as used herein is a generic term, which collectively encompasses non-epicatechins (which will hereinafter be called "non-epi bodies") such as catechin, gallocatechin, catechin gallate and gallocatechin gallate, and epicatechins (which will hereinafter be called "epi bodies") such as epicatechin, epigallocatechin, epicatechingallate and epigallocatechingallate. The concentration of non-polymer catechins is defined based on the total amount of the eight non-polymer catechins mentioned above.

The packaged beverage according to the present invention contains non-polymer catechins in an amount ranging from 0.05 to 0.5% by mass, preferably from 0.07 to 0.4% by mass, more preferably from 0.08 to 0.3% by mass, even more preferably from 0.09 to 0.2% by mass. The ingestion of non-polymer catechins is expected to become much easier in high volume and thus obtain the physiological effects of non-polymer catechins, insofar as falling into such a range. When the content of non-polymer catechins is 0.05% by mass or higher, the taste stability gets better, while the content of non-polymer catechins of 0.5% by mass or lower 0.5% by mass provides for a good taste.

The non-epi-bodies in the packaged beverage according to the present invention are practically not found in the natural world, and are formed by thermal denaturation of the epi-bodies. The percentage of the non-epi-bodies (I) of non-polymer catechins in the non-polymer catechins (A) usable in the packaged beverage according to the present invention (the percentage of non-epi-bodies: [(I)/(A)]×100) is preferably from 5 to 25% by mass, more preferably from 8 to 20% by mass, even more preferably from 10 to 15% by mass from the viewpoints of taste and the storage stability of the non-polymer catechins.

The non-polymer catechins in the packaged beverage according to the present invention include gallate bodies consisting of epigallocatechin gallate, gallocatechin gallate, epicatechin gallate and catechin gallate; and non-gallate bodies consisting of epigallocatechin, gallocatechin, epicatechin and catechin. The percentage of the gallate bodies (J) of non-polymer catechin gallates in the non-polymer catechins (A) usable in the packaged beverage according to the present invention ([the percentage of the gallate bodies: (J)/(A)]× 100) is from 5 to 55% by mass. From the viewpoints of the stability of the beverage and the suppression of bitterness, its lower limit may be preferably 8% by mass, more preferably 10% by mass, more preferably 15% by mass, even more preferably 20% by mass, while its upper limit may be preferably 52% by mass, more preferably 51% by mass, more preferably 50% by mass, more preferably 46% by mass, more preferably 45% by mass, even more preferably 40% by mass.

The packaged beverage containing non-polymer catechins in high concentration in the present invention may preferably be one containing a purified product of green tea extract mixed therein. In the present invention, the concentration of non-polymer catechins can be adjusted, for example, by further mixing a green tea extract or a concentrate thereof in the purified product of green tea extract. Specifically, the purified product of green tea extract can be an aqueous solution of the purified product of green tea extract; or one obtained by mixing, in the purified product of green tea extract, a green tea extract or a concentrate thereof, a semi-fermented tea extract or a concentrate thereof, or a fermented tea extract or a concentrate thereof. The term "a concentrate of a tea extract" as used herein means one obtained with an increased concentration of non-polymer catechins by removing, from a solution extracted from tea leaves with hot water or a water-soluble organic solvent, a portion of the solvent, and as its forms, various forms such as a solid, aqueous solution and slurry can be mentioned. As the concentrate of the tea extract, a concentrate of green tea extract or a concentrate of fermented tea (black tea) extract is preferred. Further, the term "tea extract" means one extracted with hot water or a water-soluble organic solvent from tea leaves selected from unfermented tea, semi-fermented tea or fermented tea and not subjected to any concentration or purification operation, and means a concept that embraces tea extracts therein.

The concentrate of green tea extract containing non-polymer catechins can be selected from commercial products such as "POLYPHENON" (Mitsui Norin Co., Ltd.), "TEAFURAN (ITO EN, LTD.), and "SUNPHENON" (Taiyo Kagaku Co., Ltd.).

As a purification method, there is, for example, a method that suspends a purified product of green tea extract in water or a mixture (hereinafter called "an aqueous solution of organic solvent") of water and an organic solvent such as ethanol, removes the resulting precipitate, and then distillates off the solvent.

Preferred as the purified product of green tea extract, the purified product being for use in the present invention, is one obtained by subjecting, in addition to or in place of the above-mentioned precipitate removal treatment, a green tea extract or a concentrate thereof (hereinafter called "a green tea extract or the like") to treatment by one or more of the following methods.

(i) a method that adds at least one treatment material selected from activated carbon, acid clay or activated clay to the green tea extract or the like and conducts treatment.

(ii) a method that subjects the green tea extract or the like to tannase treatment.

(iii) a method that subjects the green tea extract or the like to treatment with a synthetic adsorbent.

In the purification of the green tea extract, it is preferred to add at least one treatment material selected from activated carbon, acid clay or activated clay and to conduct purification before suspending the green tea extract or the like in water or an aqueous solution of organic solvent and removing the resulting precipitate. It is more preferred to add activated carbon and acid clay or activated clay to conduct the treatment. No particular limitation is imposed on the order in which the green tea extract or the like is brought into contact with activated carbon, acid clay or activated clay. There can be mentioned, for example, (1) a method that brings the green tea extract or the like into contact with activated carbon and acid clay or activated clay after dispersing or dissolving the green tea extract or the like in water or an aqueous solution of organic solvent, (2) a method that brings a dispersion, in which activated carbon and acid clay or activated clay are dispersed in water or an aqueous solution of organic solvent, and the green tea extract or the like into contact with each other and conducts the treatment, and (3) a method that subsequent to dispersion or dissolution of the green tea extract or the like in water or an aqueous solution of organic solvent, brings the dispersion or solution into contact with acid clay or activated clay and then with activated carbon, or into contact with activated carbon and then with acid clay or activated clay.

Among these, the method (1) or (3) is preferred. It is to be noted that a filtration step may be interposed between the respective steps in each of the methods (1) to (3) and subsequent to separation by filtration, the procedure may then move to the subsequent step.

As the organic solvent for use in the purification of the green tea extract, a water-soluble organic solvent is preferred. Examples include alcohols such as methanol and ethanol, ketones such as acetone, and esters such as ethyl acetate, with ethanol being preferred especially in view of use in beverages or foods. The water can be deionized water, tap water, natural water or the like, with deionized water being preferred especially from the standpoint of taste.

The mixing mass ratio of the organic solvent to the water may be set preferably at from 60/40 to 97/3, more preferably from 60/40 to 95/5, still more preferably from 85/15 to 95/5 from the standpoints of the extraction efficiency of non-polymer catechins, the purification efficiency of the green tea extract, and so on.

As the proportions of the green tea extract or the like and the water or the aqueous solution of organic solvent, the green tea extract (dry mass basis) can be added in a proportion of preferably from 10 to 40 mass parts, more preferably from 10 to 30 mass parts to 100 mass parts of the water or the aqueous solution of organic solvent to conduct the treatment, because the green tea extract can be efficiently treated.

For the contact treatment, it is preferred to include an aging time of from 10 to 180 minutes or so. Such treatment can be conducted at from 10 to 60° C., preferably at from 10 to 50° C., more preferably from 10 to 40° C.

As the activated carbon for use in the contact treatment, a commercial product such as, for example, "ZN-50" (product of Hokuetsu Carbon Industry Co., Ltd.), "KURARAY COAL GLC", "KURARAY COAL PK-D" or "KURARAY COAL PW-D" (product of Kuraray Chemical K.K.), or "SHIRASAGI AW50", "SHIRASAGI A", "SHIRASAGI M" or "SHIRASAGI C" (product of Takeda Pharmaceutical Company Limited) can be used.

The pore volume of the activated carbon may be in a range of preferably from 0.01 to 0.8 mL/g, more preferably from 0.1 to 0.8 mL/g. Concerning the specific surface area, on the other hand, one having a specific surface area in a range of preferably from 800 to 1,600 m$^2$/g, more preferably from 900 to 1,500 m$^2$/g is preferred. It is to be noted that these physical values are those determined by the nitrogen adsorption method.

The activated carbon can be added preferably in a proportion of from 0.5 to 8 mass parts, more preferably from 0.5 to 3 mass parts to 100 mass parts of the water or the aqueous solution of organic solvent because of the purification efficiency of the green tea extract and smaller cake resistance in the filtration step.

The acid clay and activated clay for use in the contact treatment both contain, as general chemical components, $SiO_2$, $Al_2O_3$, $Fe_2O_3$, CaO, MgO, etc., and those having $SiO_2$/$Al_2O_3$ ratios of from 3 to 12, preferably from 4 to 9 are employed. Also preferred are those which have compositions containing from 2 to 5% by mass of $Fe_2O_3$, from 0 to 1.5% by mass of CaO and from 1 to 7% by mass of MgO.

The specific surface areas of the acid clay and activated clay may preferably be from 50 to 350 m$^2$/g, and their pHs (5% by mass suspensions) may be preferably from 2.5 to 8, more preferably from 3.6 to 7. As the acid clay, for example, a commercial product such as "MIZUKA ACE #600" (product of Mizusawa Chemical Industries, Ltd.) can be used.

The ratio of the activated carbon to the acid clay or activated clay may be from 1 to 10 of the acid clay or activated clay to 1 of the activated carbon by mass, with the activated carbon:the acid clay or activated clay=1:1 to 1:6 being preferred.

The acid clay or activated clay can be added in a proportion of preferably from 2.5 to 25 mass parts, more preferably from 2.5 to 15 mass parts to 100 mass parts of the water or aqueous solution of organic solvent. The addition of the acid clay or the like in a proportion of 2.5 or less mass parts leads to good efficiency for the purification of the green tea extract, while the addition of the acid clay or the like in a proportion of 25 or less mass parts develops no production problem such as cake resistance in the filtration step.

Upon separation of the activated carbon or the like from the water or the aqueous solution of organic solvent, the temperature may be preferably from −15 to 78° C., more preferably from −5 to 40° C. Within this temperature range, the separation performance is good. As a separation method, a conventionally-known technology can be used. For example, the separation may be effected by passing the water or the aqueous solution of organic solvent through a column packed with a granular substance such as activated carbon, instead of a method such as so-called filter separation or centrifugal separation.

The non-polymer catechins for use in the present invention can be lowered in the percentage of the gallate bodies by subjecting the green tea extract or the purified product thereof to tannase treatment. The tannase for use in the treatment can be any tannase insofar as it has activity to hydrolyze non-polymer catechin gallates. Specifically, tannase obtainable by culturing a tannase-producing fungus of the *Aspergillus, Penicillium* or *Rhizopus* genus can be used. More preferred is tannase available from *Aspergillus oryzae*. As commercial products of enzymes having tannase activity, "PECTINASE PL AMANO" (product of Amano Enzyme Inc.), "HEMISELLULASE AMANO 90" (product of Amano Enzyme Inc.), "TANNASE KTFH" (product of Kikkoman Corporation), and the like can be used.

The enzyme, which has tannase activity and is to be used in the present invention, may preferably have an enzyme activity of from 500 to 100,000 U/g. An enzyme activity of 500 U/g or higher makes it possible to easily conduct the treatment in a time that industrially poses no problem, while an enzyme activity of 100,000 U/g or lower makes it possible to readily control the reaction system. It is to be noted that "1 Unit" indicates an amount of enzyme that hydrolyses 1 micromole of ester bonds, which are contained in tannic acid, in water of 30° C. Therefore, the term "having tannase activity" means to have activity to degrade tannin, and any desired enzyme can be used insofar as it has this activity.

Upon conducting this tannase treatment, the tannase may be added such that its amount falls within a range of preferably from 0.5 to 10% by mass relative to the non-polymer catechins in the green tea extract. The temperature of the tannase treatment may be preferably from 15 to 40° C. at which its enzyme activity is available, with from 20 to 30° C. being more preferred. This temperature should be maintained until the percentage of the gallate bodies falls within the above-described range. At the time of the tannase treatment, the pH may be preferably from 4 to 6 at which its enzyme activity is available, with from 4.5 to 6 being more preferred, and from 5 to 6 being still more preferred. Subsequently, the temperature is raised as promptly as possible to from 45 to 95° C., preferably from 75 to 95° C. such that the tannase is inactivated to terminate the reaction. By the inactivation treatment of the tannase, any subsequent reduction in the percentage of the gallate bodies can be avoided, thereby making it possible to obtain a purified product of green tea extract with intended percentage of the gallate bodies.

In the present invention, the green tea extract or the like can be purified further by treating it with a synthetic adsorbent. A synthetic adsorbent is generally an insoluble polymer of three-dimensionally-crosslinked structure, and is substantially free of functional groups such as ion-exchanging groups. As the synthetic adsorbent, it is preferred to use one having an ion exchange capacity of lower than 1 meq/g. Usable examples of such a synthetic adsorbent include commercial products such as styrene-based adsorbents such as "AMBERLITE XAD4, XAD16HP, XAD1180, XAD2000" (supplier: Rohm & Haas USA), "DIAION HP20, HP21" (products of Mitsubishi Chemical Corporation), "SEPABEADS SP850, SP825, SP700, SP70" (products of Mitsubishi Chemical Corporation), and "VPOC1062" (product of Bayer AG); modified styrene-based adsorbents with adsorptive capacity enhanced by nuclear substitution with bromine atoms, such as "SEPABEADS SP205, SP206, SP207" (products of Mitsubishi Chemical Corporation); methacrylic adsorbents such as "DIAION HP1MG, HP2MG" (products of Mitsubishi Chemical Corporation); phenol-based adsorbents such as "AMBERLITE XAD761" (product of Rohm & Haas, Inc.); acrylic adsorbents such as "AMBERLITE XAD7HP" (product of Rohm & Haas, Inc.); polyvinyl-based adsorbents such as "TOYOPEARL HW-40C" (product of TOSOH CORPORATION); and dextran-based adsorbents such as "SEPHADEX LH-20" (product of Pharmacia AB).

The matrix of the synthetic adsorbent may preferably be of the styrene base, methacrylic base, acrylic base or polyvinyl base, with a styrene base being preferred from the standpoint of separability between non-polymer catechins and caffeine.

As a manner of adsorbing the green tea extract or the like on the synthetic adsorbent in the present invention, it is possible to adopt a batch process that adds the synthetic adsorbent to the green tea extract or the like, stirs the mixture, and subsequent to adsorption, recovers the synthetic adsorbent by a filter operation; or a column process that performs adsorption treatment through continuous treatment by using a column packed with the synthetic adsorbent. The continuous treatment method using column is preferred from the stand point of productivity. The amount of the adsorbent to be used can be suitably determined depending on the kind of the tea extract or the like to be used, but can be, for example, 200% by mass or smaller based on the mass (dry mass) of the green tea extract.

The column with the synthetic adsorbent packed therein may preferably be washed beforehand with a 95 vol % aqueous solution of ethanol at SV (space velocity)=0.5 to 10 [h⁻] under loading conditions of from 2 to 10 [v/v] as a loading ratio to the synthetic adsorbent to remove the raw monomer for the synthetic adsorbent and other impurities and the like. The adsorptive capacity for non-polymer catechins can be improved by a method that subsequently conducts washing with water at SV=0.5 to 10 [h⁻] under loading conditions of from 1 to 60 [v/v] as a loading ratio to the synthetic adsorbent to remove ethanol and hence to replace the solution, in which the synthetic adsorbent is contained, with a water-based medium.

As conditions for loading the green tea extract or the like on the column packed with the synthetic adsorbent, it is preferred to load the green tea extract under loading conditions of a loading rate of SV (space velocity)=0.5 to 10 [h⁻] and a loading ratio of from 0.5 to 20 [v/v] to the synthetic adsorbent.

A loading rate of 10 [h⁻] or lower and a loading ratio of 20 [v/v] or smaller result in sufficient adsorption of the non-polymer catechins or the like on the synthetic adsorbent.

After the green tea extract is loaded, non-polymer catechins are then eluted with an aqueous solution of organic solvent. As the aqueous solution of organic solvent, a mixed system of a water-soluble organic solvent and water is used. As the water-soluble organic solvent, organic solvents similar to those described above can be exemplified. Among them, ethanol is preferred from the viewpoint of use in beverages or foods. The concentration of the water-soluble organic solvent may be preferably from 5.0 to 50.0% by mass, more preferably from 10.0 to 30.0% by mass, even more preferably from 15.0 to 25.0% by mass from the standpoint of the recovery rate of non-polymer catechins.

It is preferred to elute non-polymer catechins by loading the aqueous solution of organic solvent under conditions of a loading rate of SV (space velocity)=2 to 10 [h⁻] and a loading ratio of from 1 to 30 [v/v] to the synthetic adsorbent. From the standpoints of purification efficiency and the recovery rate of non-polymer catechins, it is more preferred to conduct the elution under loading conditions of a loading rate of SV=3 to 7 [h⁻] and a loading ratio of from 3 to 15 [v/v].

The content mass ratio ((K)/(A)) of the caffeine (K) to the non-polymer catechins (A) in the packaged beverage according to the present invention may be preferably from 0.0001 to 0.16, more preferably from 0.001 to 0.15, more preferably from 0.01 to 0.14, even more preferably from 0.05 to 0.13. A ratio of caffeine to non-polymer catechins of 0.0001 or greater makes it possible to retain the taste balance. A ratio of caffeine to non-polymer catechins of 0.16 or smaller, on the other hand, provides the beverage with good stability. The caffeine can be the caffeine naturally found in a green tea extract, flavor, fruit extract and any other ingredient(s) employed as ingredients, or can be caffeine added newly.

The calcium (B) used in the packaged beverage according to the present invention can be included in the form of a metal salt in the packaged beverage. As such a metal salt, it is possible to mix, for example, calcium citrate, calcium acetate, calcium lactate, calcium pantothenate, calcium carbonate, calcium chloride, calcium hydroxide, calcium sulfate, tricalcium phosphate, calcium monohydrogen phosphate, calcium dihydrogen phosphate, calcium glycerophosphate, calcium gluconate, calcined calcium (calcined calcium of sea urchin shells, calcined shell calcium, calcined bone calcium) or the like, or a mixture thereof.

The total content of calcium for use in the packaged beverage according to the present invention is from 0.0012 to 0.12% by mass, with from 0.01 to 0.1% by mass being preferred, and from 0.03 to 0.06% by mass being more preferred. A total calcium content of 0.0012% by mass or higher makes it possible to easily ingest the nutrient sufficiently, and a total calcium content of 0.12% by mass or lower provides a sufficient taste.

The content mass ratio [(B)/(A)] of the calcium (B) to the non-polymer catechins (A) in the packaged beverage according to the present invention is from 0.001 to 1.0. From the viewpoint of suppression of the bitterness of catechins, however, the content mass ratio may be preferably from 0.01 to 0.5, more preferably from 0.01 to 0.4, even more preferably from 0.05 to 0.25.

The magnesium (C) for use in the packaged beverage according to the present invention can be mixed in the form of a readily-available salt such as magnesium chloride, magnesium oxide, magnesium carbonate, magnesium sulfate, trimagnesium phosphate, magnesium lactate or the like, or a mixture thereof.

The total content of magnesium for use in the packaged beverage according to the present invention is from 0.00012 to 0.006% by mass, with from 0.0003 to 0.004% by mass being preferred, and from 0.0005 to 0.002% by mass being more preferred. A total magnesium content of 0.00012% by mass or higher makes it possible to assure the necessary magnesium amount, and a total magnesium content of 0.006% by mass or lower provides a good taste.

The zinc (D) for use in the packaged beverage according to the present invention can be mixed in the form of a readily-available salt such as a zinc salt, zinc gluconate, zinc sulfate, zinc chloride, zinc oxide, zinc stearate or the like, or a mixture thereof.

The total content of zinc for use in the present invention is from 0.000048 to 0.0024% by mass, with from 0.00007 to 0.0015% by mass being preferred, and from 0.0001 to 0.001% by mass being more preferred. A total zinc content of 0.000048% by mass or higher makes it possible to readily ingest the nutrient sufficiently, and a total zinc content of 0.0024% by mass or lower provides the beverage with a good taste.

The iron (E) for use in the packaged beverage according to the present invention can be mixed in the form of a readily-available salt such as ferric chloride, iron citrate, ferric pyrophosphate, ferric pyrophosphate solution, ferrous sulfate, iron ammonium citrate, ferrous gluconate, iron lactate or the like, or a mixture thereof.

The total content of iron for use in the packaged beverage according to the present invention is from 0.00004 to 0.002% by mass, with from 0.0001 to 0.0015% by mass being preferred, and from 0.0001 to 0.0012% by mass being more preferred. A total iron content of 0.00004% by mass or higher makes it possible to readily ingest the nutrient sufficiently, and a total iron content of 0.002% by mass or lower assures stability for the color tone of the beverage.

In the packaged beverage according to the present invention, a naturally-occurring carbohydrate, a glycerol or an artificial sweetener can be used as the sweetener (F). Such sweetener(s) is (are) contained at from 0.0001 to 20% by mass, preferably at from 0.001 to 15% by mass, more preferably from 0.01 to 10% by mass in total in the packaged beverage according to the present invention. It is to be noted that these sweeteners include those contained in the tea extract.

If the sweetener is too little, the packaged beverage according to the present invention has substantially no sweetness so that its sweetness can be difficultly balanced with its sourness or saltiness. Therefore, the degree of its sweetness may be preferably at least 2, more preferably from 2 to 8 when sucrose is assumed to have a sweetness degree of 1 (References: JIS Z8144, Sensory Assessment Analysis-Terms, No. 3011, Sweetness; JIS 29080, Sensory Assessment Analysis-Methods, Testing Method; Beverage Term Dictionary, 4-2 Classification of Sweetness Degrees, Material 11 (Beverage Japan, Inc.); Property Grading Test mAG Test, ISO 6564-1985(E), "Sensory Analysis—Methodology-Flavour profile method", etc.).

Naturally-occurring carbohydrate sweeteners include monosaccharides, oligosaccharides, complex polysaccharides, and mixtures thereof. Among these, preferred can be one or more carbohydrates selected from glucose, fructose, sucrose, glucofructose syrup and fructoglucose syrup.

The content of glucose in the packaged beverage according to the present invention may be preferably from 0.0001 to 20% by mass, more preferably from 0.001 to 15% by mass, even more preferably from 0.01 to 10 by mass. The content of fructose in the packaged beverage according to the present invention may be preferably from 0.0001 to 20% by mass, more preferably from 0.001 to 15% by mass, even more preferably from 0.01 to 10% by mass. Further, the content of glucofructose syrup or fructoglucose syrup may be preferably from 0.01 to 7% by mass, more preferably from 0.1 to 6% by mass, even more preferably from 1 to 5% by mass. It is to be noted that, when the total content of such sweetener(s) is 20% by mass or lower, the coloration due to the Maillard reaction during the storage of the beverage can be prevented.

As the oligosaccharides, sucrose, malt dextrin, corn syrup, high-fructose corn syrup, agape extract, maple syrup, sugarcane, honey and the like can be mentioned, for example. Among these oligosaccharides, sucrose is preferred. As forms of sucrose, there are granulated sugar, liquid sugar, white superior soft sugar, etc., and they are all usable. The content of sucrose in the packaged beverage according to the present invention may be preferably from 0.001 to 20% by mass, more preferably from 0.01 to 15% by mass, even more preferably from 0.1 to 10% by mass.

A preferred example of complex polysaccharide is malt dextrin. In addition, polyhydric alcohols, for example, glycerols can also be used in the present invention. A glycerol can be used, for example, at from 0.1 to 15% by mass, preferably at from 0.2 to 10% by mass in the packaged beverage according to the present invention.

As the sugar alcohols in the sweeteners usable in the packaged beverage according to the present invention, erythritol, sorbitol, xylitol, trehalose, maltitol, lactitol, palatinose, mannitol and the like can be mentioned. Among these, erythritol is preferred as it has no calorific value and its maximum non-effect intake is highest. The content of such a sugar alcohol in the packaged beverage according to the present invention is from 0.01 to 5% by mass, with from 0.02 to 3% by mass being preferred, and from 0.03 to 2% by mass being more preferred. The setting of the content of the sugar alcohol within the above-described range provides a beverage, which has a low calorific value, permits easy intake of electrolytes such as sodium and potassium in the body, and is good in stability. A sugar alcohol content of 0.01% by mass or lower is not sufficiently effective for the intake of electrolytes, while a sugar alcohol content of 5% by mass or higher may cause maldigestion after drinking.

Among the sweeteners usable in the packaged beverage according to the present invention, the artificial sweeteners include high-sweetness sweeteners such as aspartame, sucralose, saccharin, cyclamate, acesulfame-K, L-aspartyl-L-phenylalanine lower alkyl ester, L-aspartyl-D-alanine amide, L-aspartyl-D-serine amide, L-aspartyl-hydroxymethylalkanamide, L-aspartyl-1-hydroxyethylalkanamide and sucralose, glycyrrhizin, and synthetic alkoxyaromatic compounds. The content of such an artificial sweetener is from 0.0001 to 20 by mass. Thaumatin, stevioside and other natural-source sweeteners are also usable.

In the packaged beverage according to the present invention, sodium (G) and/or potassium (H) can be incorporated at from 0.001 to 0.5% by mass and from 0.001 to 0.2% by mass, respectively, as electrolyte (s). The total concentration of sodium and potassium may preferably be from 0.001 to 0.5 by mass. A total concentration of 0.001% by mass or higher provides a good taste, while a total concentration of 0.5% by mass or lower can keep the beverage stable.

As the sodium (G) for use in the present invention, one or more of readily-available sodium salts such as sodium ascorbate, sodium chloride, sodium carbonate, sodium hydrogencarbonate, sodium citrate, sodium phosphate, sodium hydrogenphosphate, sodium tartrate, sodium benzoate and the like, and mixtures thereof can be mixed. The sodium includes that originated from an added fruit extract or that contained as an ingredient in tea. From the viewpoint of the stability of the beverage, the content of sodium in the packaged beverage according to the present invention may be preferably from 0.001 to 0.5% by mass, more preferably from 0.002 to 0.4% by mass, even more preferably from 0.003 to 0.2% by mass. At a sodium concentration of 0.5% by mass or lower, the stability of the beverage is good.

As the potassium (H) for use in the present invention, a compound other than the potassium contained in the tea extract can be added to increase its concentrate. For example, one or more of potassium salts such as potassium chloride, potassium carbonate, potassium sulfate, potassium acetate, potassium hydrogencarbonate, potassium citrate, potassium phosphate, potassium hydrogenphosphate, potassium tartrate, potassium solbate and the like, and mixtures thereof may be mixed. The potassium includes that originated from an added fruit extract or flavoring. From the viewpoint of stability, the content of potassium in the packaged beverage according to the present invention may be preferably from 0.001 to 0.2% by mass, more preferably from 0.002 to 0.15% by mass, even more preferably from 0.003 to 0.12% by mass. A potassium concentration of 0.2% by mass or lower does not affect the color tone much during long-term high-temperature storage.

In the packaged beverage according to the present invention, one or more vitamins can be incorporated further. As vitamins, there can be mentioned one or more vitamin Bs selected from inositol, thiamine hydrochloride, thiamine nitrate, riboflavin, riboflavin 5'-phosphate sodium, niacin, nicotinamide, calcium pantothenate, pyridoxy hydrochloride, cyanocobalamin and folic acid, and/or biotin.

The ingredients of the minerals and vitamin Bs in the packaged beverage according to the present invention can each be incorporated in an amount of at least 10 by mass of its daily requirement (U.S. RDI Standards, described in US 2005/0003068: U.S. Reference Daily Intake). Accordingly, 10% by mass or more of the daily requirements of minerals and vitamin Bs can be ingested by drinking one package (500 mL) of the packaged beverage according to the present invention per day.

In the packaged beverage according to the present invention, one or more vitamins other than those described above can be incorporated further. As such vitamins, vitamin A and vitamin E can be added preferably. Other vitamins such as vitamin D may also be added.

In the packaged beverage according to the present invention, a sour seasoning can be used. The sour seasoning in the present invention is one or more sour seasonings selected from ascorbic acid, citric acid, gluconic acid, succinic acid, tartaric acid, lactic acid, adipic acid, fumaric acid and malic acid and salts thereof. To obtain adequate sourness, it is preferred to use such an acid and its salt in combination although the single use of the acid can still provide a pH suitable for long-term storage. The salt can be, for example, a salt with an inorganic base or a salt with an organic base. Examples of the salt with the inorganic base include alkali metal salts (for example, the sodium salt and potassium salt), ammonium salts and the like. Examples of the salt with the organic base include amine salts (for example, the methylamine salt, diethylamine salt, triethylamine salt and ethylenediamine salt) and alkanolamine salts (for example, the monoethanolamine salt, diethanolamine salt and triethanol salts). Among these, alkali metals are preferred. Specifically, trisodium citrate, monopotassium citrate, tripotassium citrate, sodium gluconate, potassium gluconate, sodium tartrate, trisodium tartrate, potassium hydrogentartrate, sodium lactate, potassium lactate, sodium fumarate and the like can be mentioned. Other sour seasonings include fruit extracts extracted from natural sources.

Such a sour seasoning may be contained preferably at from 0.01 to 0.7% by mass, more preferably at from 0.02 to 0.6% by mass in the packaged beverage according to the present invention. A sour seasoning concentration of 0.01% by mass or higher can suppress bitterness and astringency, and allows to feel sourness. A sour seasoning concentration of 0.7% by mass or lower, on the other hand, provides a good taste. Further, inorganic acids and inorganic acid salts can also be used. These inorganic acids and inorganic acid salts include diammonium hydrogenphosphate, ammonium dihydrogenphosphate, dipotassium hydrogenphosphate, disodium hydrogenphosphate, sodium dihydrogenphosphate, trisodium metaphosphate, tripotassium phosphate, and the like. These inorganic acids and inorganic acid salts may be contained preferably at from 0.01 to 0.5% by mass, more preferably at from 0.02 to 0.3% by mass in the packaged beverage.

From the viewpoints of taste and storage stability, the pH of the packaged beverage according to the present invention is set in the range of from 2.5 to 5.1, and is preferably from 2.8 to 5.0, more preferably from 3.0 to 5.0, even more preferably from 3.8 to 4.5. Namely, a pH of 2.5 or higher maintains the amount of non-polymer catechins during long-term storage. A pH of 5.1 or lower, on the other hand, can retain its stability even during long-term storage. The pH can be adjusted with ascorbic acid or its salt, citric acid or the like to the above-describe range. By this pH adjustment, a beverage permitting long-term storage and having adequate sourness is obtained.

It is possible to mix one or more of flavorings (flavors) and fruit extracts (fruit juices) to the packaged beverage according to the present invention with a view to improving its taste. Natural or synthetic flavorings and fruit extracts can be used in the present invention. They can be selected from fruit juices, fruit flavors, plant flavors, and mixtures thereof. For example, a combination of a fruit juice with a tea flavor, preferably a green tea or black tea flavor is preferred to have an appealing taste. Preferred usable fruit extracts include apple, pear, lemon, lime, mandarin, grapefruit, cranberry, orange, strawberry, grape, kiwi, pineapple, passion fruit, mango, guava, raspberry, and cherry juices. Among these, more preferred are citrus juices (preferably, grapefruit, orange, lemon, lime and mandarin), mango juice, passion fruit juice, guava juice, and mixtures thereof. Preferred natural flavors include jasmine, chamomile, rose, peppermint, *Crataegus cuneata*, chrysanthemum, water caltrop, sugarcane, bracket fungus of the genus *Fomes* (*Fomes japonicus*), bamboo shoot, and the like. Such a fruit extract may be contained preferably at from 0.001 to 20% by mass, more preferably at from 0.002 to 10% by mass in the packaged beverage according to the present invention. Even more preferred flavorings are citrus flavors including orange flavor, lemon flavor, lime flavor and grapefruit flavor. In addition to such citrus flavors, various other fruit flavors such as apple flavor, grape flavor, raspberry flavor, cranberry flavor, cherry flavor and pineapple flavor are also usable. These flavors can be derived from natural sources such as fruit extracts and balms, or can be synthesized.

The flavorings can also include blends of various flavors, for example, a blend of lemon and lime flavors and blends of citrus flavors and selected spices (typically, cola and soft drink flavors). Such a flavoring can be mixed preferably at from 0.0001 to 5% by mass, more preferably at from 0.001 to 3% by mass to the packaged beverage according to the present invention.

Minerals other than those described above can also be incorporated in the packaged beverage according to the present invention. Preferred minerals are chromium, copper, fluorine, iodine, manganese, phosphorus, selenium, silicon, and molybdenum. More preferred mineral is phosphorus.

In the packaged beverage according to the present invention, a cyclodextrin can also be used in combination to suppress the bitterness of non-polymer catechins. The cyclodextrin can be an α-cyclodextrin, a β-cyclodextrin or a γ-cyclodextrin.

In the packaged beverage according to the present invention, additives such as antioxidants, flavors, various esters, colors, emulsifiers, preservatives, seasoning agents, vegetable extracts, flower honey extracts, and quality stabilizers may be mixed either singly or in combination, in addition to the ingredients originated from tea, as described above.

The packaged beverage according to the present invention can be formulated into a non-carbonated beverage depending on the preference.

By formulating it into a carbonated beverage having adequate bubbling property based on carbon dioxide gas, it is possible to suppress the bitterness of non-polymer catechins, and further, to give a soft feeling and a pleasant cooling feeling over an extended time. The packaged beverage according to the present invention can also be formulated into a tea beverage or a non-tea beverage. As tea beverages, there can be mentioned non-fermented tea beverages such as green tea beverage, semi-fermented tea beverages such as oolong tea beverages, and fermented tea beverages such as black tea beverages. The packaged beverage according to the present invention can also be formulated into a functional beverage, for example, a non-tea beverage such as enhanced water, sports drink or near water.

The packaged beverage according to the present invention can also be provided as a functional beverage. The term "functional beverage" as used herein means a functional health food. Such functional health foods include specific health foods and functional nutrient foods defined by the Government of Japan.

The calorific value of the packaged beverage according to the present invention can be calculated based on 4 kcal/g for glucose, fructose and sucrose and 0 Kcal/g for erythritol contained in 100 mL of the beverage. The packaged beverage according to the present invention may preferably have a low calorific value of not greater than 40 kcal/240 mL, with from 1 to 35 kcal/240 mL being more preferred, and from 2 to 30 kcal/240 mL being even more preferred.

As a package usable for the packaged beverage according to the present invention, a package of a conventional form, such as a molded package made of polyethylene terephthalate as a principal component (a so-called PET bottle), a metal can, a paper package combined with metal foils or plastic films, a bottle or the like, can be provided. The term "packaged beverage" as used herein means one that can be taken without dilution.

The packaged beverage according to the present invention can be produced, for example, by filling the beverage in a package such as a metal can and, when heat sterilization is feasible, conducting heat sterilization under sterilization conditions prescribed in relevant regulations (in Japan, the Food Sanitation Act). For those which cannot be subjected to retort sterilization like PET bottles or paper packages, a process is adopted such that the beverage is sterilized beforehand at a high temperature for a short time under similar sterilization conditions as those described above, for example, by a plate-type heat exchanger or the like, is cooled to a particular temperature, and is then filled in a package. Under aseptic conditions, additional ingredients may be mixed to and filled in a beverage-filled package. It is also possible to conduct an operation such that subsequent to heat sterilization under acidic conditions, the pH of the beverage is caused to rise back to neutral under aseptic conditions or that subsequent to heat sterilization under neutral conditions, the pH of the beverage is caused to drop back to the acidic side under aseptic conditions.

EXAMPLES

Measurements of Non-Polymer Catechins and Caffeine

A high-performance liquid chromatograph (model: "SCL-10AVP") manufactured by Shimadzu Corporation was used. The chromatograph was fitted with a liquid chromatograph column packed with octadecyl-introduced silica gel, "L-Column, TM ODS" (4.6 mm in diameter×250 mm; product of Chemicals Evaluation and Research Institute, Japan). A sample, which had been subjected to filtration through a membrane filter (0.8 μm) and then to dilution with distilled water, was measured at a column temperature of 35° C. by the gradient elution method. A mobile phase, Solution A, was a solution containing acetic acid at 0.1 mol/L in distilled water, while another mobile phase, Solution B, was a solution containing acetic acid at 0.1 mol/L in acetonitrile. The measurement was conducted under the conditions of 20 μL sample injection volume and 280 nm UV detector wavelength (the concentrations of catechins and caffeine are generally expressed in terms of weight/volume % (%[w/v]), but their contents in each Example will be expressed in terms of % by mass by multiplying their concentrations with the amount of the solution).
Quantitation of Calcium, Magnesium, Zinc, Iron, Sodium and Potassium
Atomic Fluorescence Spectroscopy (Extraction with Hydrochloric Acid)
Each sample (5 g) was placed in 10% by mass hydrochloric acid. The resulting solution was then brought to a predetermined volume with deionized water to provide a 1% by mass hydrochloric acid solution, and its absorbance was measured.
Evaluation of Taste
With respect to the beverages obtained in the respective Examples and Comparative Examples, a drinking test was performed by a panel of five trained evaluators.
Storage Test
Each prepared beverage was stored at 37° C. for 4 weeks, and a change in the color tone of the beverage during its storage was visually graded by the panel of five trained evaluators in accordance with the following standards. Further, its taste was also evaluated.
A: Unchanged, B: slightly changed, C: changed, D: significantly changed.

Production Example 1

Production of a "Purified Product 1 of Green Tea Extract Containing Non-Polymer Catechins"

A commercial concentrate (1,000 g) of green tea extract ("POLYPHENONE HG", Mitsui Norin Co., Ltd.) was suspended in a 95% by mass aqueous solution of ethanol (9,000 g) under stirring conditions of 25° C. and 200 r/min. After activated carbon ("KURARAY COAL GLC", product of Kuraray Chemical K.K.; 200 g) and acid clay ("MIZKA ACE #600", product of Mizusawa Chemical Industries, Ltd.; 500 g) were charged, the resulting mixture was continuously stirred for about 10 minutes. Still at 25° C., stirring was then continued for about 30 minutes. After the activated carbon, acid clay and precipitate were filtered off by No. 2 filter paper, the filtrate was filtered again through a 0.2 μm membrane filter. Finally, deionized water (200 g) was added to the filtrate, ethanol was distilled off at 40° C. and 3.3 kPa to achieve vacuum concentration. An aliquot (750 g) of the concentrate was placed in a stainless steel vessel, the total amount was brought to 10,000 g with deionized water, and then, a 5% by mass aqueous solution of sodium bicarbonate (30 g) was added to adjust its pH to 5.5. Under stirring conditions of 22° C. and 150 r/min, a solution of "KIKKOMAN TANNASE KTFH" (Industrial Grade, 500 U/g minimum; 2.7 g) dissolved in deionized water (10.7 g) was then added. Upon elapsed time of 30 minutes at which the pH had dropped to 4.24, the enzyme reaction was terminated. The stainless steel vessel was next immersed in a hot bath of 95° C., and was held at 90° C. for 10 minutes to completely inactivate the enzyme activity. After the stainless steel vessel was next cooled to 25° C., concentration processing was conducted to obtain a "purified product 1 of green tea extract containing non-polymer catechins". The non-polymer catechins amounted to 15.0% by mass, and the percentage of non-polymer catechin gallates was 45.1% by mass.

Production Example 2

Production of a "Concentrate 2 of Green Tea Extract Containing Non-Polymer Catechins"

Hot water of 88° C. (4,500 g) was added to green tea leaves (produce of Kenya, large leaf variety; 300 g). After extraction for 60 minutes under stirring, coarse filtration was conducted through a 100-mesh screen. To remove fine powder from the tea extract, a centrifugal separation operation was then performed to obtain a "green tea extract" (3,680 g). An aliquot of the green tea extract was then lyophilized to obtain a "concentrate 2 of green tea extract containing non-polymer catechins". The non-polymer catechins amounted to 32.8% by mass, and the percentage of non-polymer catechin gallates was 58.6% by mass.

Production Example 3

Production of a "Purified Product 3 of Green Tea Extract Containing Non-Polymer Catechins"

The concentrate 2 of green tea extract containing non-polymer catechins was placed in a stainless steel vessel, and a 5 by mass aqueous solution of sodium bicarbonate was added to adjust its pH to 5.5. Under stirring conditions of 22° C. and 150 r/min, a solution (150 g) of "KIKKOMAN TANNASE KTFH" (Industrial Grade, 500 U/g minimum) added to deionized water at a concentration of 430 ppm based on the concentrate of green tea extract was then charged. Upon elapsed time of 55 minutes at which the pH had dropped to 4.24, the enzyme reaction was terminated. The stainless steel vessel was next immersed in a hot bath of 95° C., and was held at 90° C. for 10 minutes to completely inactivate the enzyme activity. After the stainless steel vessel was next cooled to 25° C., concentration processing and lyophilization were conducted to obtain a "purified product 3 of green tea extract containing non-polymer catechins". The non-polymer catechins amounted to 30.0 by mass, and the percentage of non-polymer catechin gallates was 20.2% by mass.

Production Example 4

Production of a "Purified Product 4 of Purified Product of Green Tea Extract Containing Non-Polymer Catechins"

A mixture of the "concentrate 2 of green tea extract containing non-polymer catechins" (25 g) and the "purified product 3 of green tea extract containing non-polymer catechins" (75 g) was suspended in a 95% by mass aqueous solution of ethanol (900 g) under stirring conditions of 25° C. and 200 r/min. After activated carbon "KURARAY COAL GLC" (20 g, product of Kuraray Chemical K.K.) and acid clay "MIZKA ACE #600" (50 g, product of Mizusawa Chemical Industries, Ltd.) were charged, the resulting mixture was continuously stirred for about 10 minutes. Still at 25° C., stirring was then continued for about 30 minutes. After the activated carbon, acid clay and precipitate were then filtered off by No. 2 filter paper, the filtrate was filtered again through a 0.2 µm membrane filter. Finally, deionized water (200 g) was added to the filtrate, ethanol was distilled off at 40° C. and 3.3 kPa to achieve vacuum concentration, and a "purified product 4 of green tea extract containing non-polymer catechins" was obtained. The non-polymer catechins amounted to 30.8% by mass, and the percentage of non-polymer catechin gallates was 30.4% by mass.

Production Example 5

Production of a "Purified Product 5 of Green Tea Extract Containing Non-Polymer Catechins"

The "purified product 3 of green tea extract containing non-polymer catechins" (85 g) was dissolved under stirring at 25° C. for 30 minutes in deionized water (8,415 g) (tannase-treated solution). A synthetic adsorbent "SP-70" (product of Mitsubishi Chemical Corporation; 2,048 mL) was packed in a stainless steel column 1 (110 mm inner diameter×230 mm height, volume: 2,185 mL). The tannase-treated solution (8,200 g, 4 volumes relative to the synthetic adsorbent) was loaded at SV=1 ($h^{-1}$) on the column 1 and the outflow was discarded. Subsequent to washing with water, a 20% by mass aqueous solution of ethanol (10,240 mL, 5 volumes relative to the synthetic adsorbent) was loaded at SV=1 ($h^{-1}$) to obtain a "resin-treated product 1" (pH 4.58). Granular activated carbon "TAIKO SGP" (product of Futamura Chemical Co., Ltd.; 8.5 g) was then packed in a stainless steel column 2 (22 mm inner diameter×145 mm height, volume: 55.1 mL), and the "resin-treated product 1" was loaded at SV=1 ($h^{-1}$) on the column 2. Concentration processing and lyophilization were then conducted to obtain a "purified product 5 of green tea extract containing non-polymer catechins". The non-polymer catechins amounted to 77.6% by mass, and the percentage of non-polymer catechin gallates was 20.2% by mass.

Example 1

The "purified product 1 of green tea extract containing non-polymer catechins" (5.3 g), the "concentrate 2 of green tea extract containing non-polymer catechins" (2.2 g), calcium lactate pentahydrate (3.5 g), magnesium lactate trihydrate (0.1 g), zinc sulfate (0.0123 g), iron gluconate (0.0086 g), niacin (vitamin B3, 0.0016 g), calcium pantothenate (vitamin B5, 0.0005 g) and pyridoxy hydrochloride (vitamin B6, 0.0001 g) were dissolved in water. Anhydrous crystalline fructose, erythritol, sodium L-ascorbate and a green tea flavor were then added, and the total amount was brought to 1,000 g. Subsequent to mixing, the beverage was subjected to UHT sterilization and was then filled in a PET bottle. The composition of the packaged green tea beverage and the evaluation results of its taste and stability are shown in Table 1.

Example 2

A packaged green tea beverage was produced in a similar manner as in Example 1 except that the "purified product 5 of green tea extract containing non-polymer catechins" (1 g) was used in place of the "purified product 1 of green tea extract containing non-polymer catechins". Its composition and the evaluation results of its taste and stability are shown in Table 1.

Example 3

A packaged black tea beverage was produced in a similar manner as in Example 1 except that the mixed amounts of the "purified product 1 of green tea extract containing non-polymer catechins" and "calcium lactate pentahydrate" were changed to the amounts shown in Table 1 and a concentrate of black tea extract (0.5 g) and a black tea flavor (1 g) were used in place of the "concentrate 2 of green tea extract containing non-polymer catechins". Its composition and the evaluation results of its taste and stability are shown in Table 1.

Example 4

A packaged black tea beverage was produced in a similar manner as in Example 3 except that the "purified product 4 of green tea extract containing non-polymer catechins" (4.2 g) was used in place of the "purified product 1 of green tea extract containing non-polymer catechins" and the mixed amount of "calcium lactate pentahydrate" was increased. Its composition and the evaluation results of its taste and stability are shown in Table 1.

Example 5

A packaged black tea beverage was produced in a similar manner as in Example 3 except that the "purified product 5 of green tea extract containing non-polymer catechins" (1.6 g) was used in place of the "purified product 1 of green tea extract containing non-polymer catechins" and the mixed amount of "calcium lactate pentahydrate" was increased. Its composition and the evaluation results of its taste and stability are shown in Table 1.

Example 6

The "purified product 1 of green tea extract containing non-polymer catechins" (8.5 g) and similar mineral salts and vitamin Bs as in Example 1 were dissolved in water. Anhydrous crystalline fructose, erythritol, citric acid anhydride, trisodium citrate, L-ascorbic acid and a lemon lime flavor were then added, and the total amount was brought to 1,000 g. Subsequent to mixing, the beverage was subjected to UHT sterilization and was then filled in a PET bottle. The composition of the packaged non-tea beverage and the evaluation results of its taste and stability are shown in Table 1.

Example 7

A packaged non-tea beverage was produced in a similar manner as in Example 6 except that inositol (1 g) was used in place of niacin, calcium pantothenate and pyridoxy hydrochloride. Its composition and the evaluation results of its taste and stability are shown in Table 1.

Comparative Example 1

A packaged non-tea beverage was produced in a similar manner as in Example 6 except that the mineral salts were not used. Its composition and the evaluation results of its taste and stability are shown in Table 1.

Comparative Example 2

A packaged green tea beverage was produced in a similar manner as in Example 1 except that calcium lactate pentahydrate was not used. Its composition and the evaluation results of its taste and stability are shown in Table 1.

Comparative Example 3

A packaged green tea beverage was produced in a similar manner as in Example 6 except that the "concentrate 2 of green tea extract containing non-polymer catechins" was used in place of the "purified product 1 of green tea extract containing non-polymer catechins" and a green tea flavor was mixed further. Its composition and the evaluation results of its taste and stability are shown in Table 1.

Comparative Example 4

A packaged green tea beverage was produced in a similar manner as in Example 6 except that the mixed amount of citric acid anhydride was increased and sodium citrate was not used. Its composition and the evaluation results of its taste and stability are shown in Table 1.

Comparative Example 5

A packaged green tea beverage was produced in a similar manner as in Example 6 except that the mixed amount of sodium citrate was increased. Its composition and the evaluation results of its taste and stability are shown in Table 1.

TABLE 1

| | | Examples | | | | | |
|---|---|---|---|---|---|---|---|
| | | 1 | 2 | 3 | 4 | 5 | 6 |
| | Purified product of green tea extract containing non-polymer catechins (Production Examples) | 1 | 5 | 1 | 4 | 5 | 1 |
| Formulations | Purified product of green tea extract containing non-polymer catechins (% by mass) | 0.53 | 0.1 | 0.85 | 0.42 | 0.16 | 0.85 |
| | Concentrate of green tea extract (% by mass) | 0.22 | 0.22 | — | — | — | — |
| | Concentrate of black tea extract (% by mass) | — | — | 0.05 | 0.05 | 0.05 | — |
| | (B) Calcium lactate pentahydrate (% by mass) | 0.35 | 0.35 | 0.01 | 0.35 | 0.35 | 0.35 |
| | (C) Magnesium lactate trihydrate (% by mass) | 0.01 | 0.01 | 0.01 | 0.01 | 0.01 | 0.01 |
| | (D) Zinc sulfate (% by mass) | 0.00123 | 0.00123 | 0.00123 | 0.00123 | 0.00123 | 0.00123 |
| | (E) Iron gluconate (% by mass) | 0.00086 | 0.00086 | 0.00086 | 0.00086 | 0.00086 | 0.00086 |
| | Niacin (% by mass) VB3 | 0.00016 | 0.00016 | 0.00016 | 0.00016 | 0.00016 | 0.00016 |
| | (B) Calcium pantothenate (% by mass) VB5 | 0.00005 | 0.00005 | 0.00005 | 0.00005 | 0.00005 | 0.00005 |
| | Pyridoxy hydrochloride (% by mass) VB6 | 0.00001 | 0.00001 | 0.00001 | 0.00001 | 0.00001 | 0.00001 |
| | Inositol (% by mass) | — | — | — | — | — | — |
| | (F) Anhydrous crystalline fructose (% by mass) | 3.66 | 3.66 | 3.66 | 3.66 | 3.66 | 3.66 |
| | (F) Erythritol (% by mass) | 0.75 | 0.75 | 0.75 | 0.75 | 0.75 | 0.75 |
| | Sodium L-ascorbate (% by mass) | 0.03 | 0.03 | 0.03 | 0.03 | 0.03 | 0.03 |
| | Citric acid anhydride (% by mass) | — | — | — | — | — | 0.1 |
| | Trisodium citrate (% by mass) | — | — | — | — | — | 0.061 |
| | Green tea flavor (% by mass) | 0.1 | 0.1 | — | — | — | — |
| | Black tea flavor (% by mass) | — | — | 0.1 | 0.1 | 0.1 | — |
| | Lemon lime flavor (% by mass) | — | — | — | — | — | 0.1 |
| | Deionized water (% by mass) | Balance | Balance | Balance | Balance | Balance | Balance |
| | Total amount (% by mass) | 100 | 100 | 100 | 100 | 100 | 100 |
| | (A) Non-polymer catechins (% by mass) | 0.151 | 0.151 | 0.128 | 0.129 | 0.129 | 0.127 |
| | (B) Ca (% by mass) | 0.052 | 0.052 | 0.0013 | 0.051 | 0.051 | 0.053 |
| | Ca/non-polymer catechins (B)/(A) (—) | 0.344 | 0.344 | 0.0102 | 0.395 | 0.395 | 0.417 |
| | (C) Magnesium (% by mass) | 0.0013 | 0.0011 | 0.0011 | 0.0011 | 0.0011 | 0.0011 |
| | (D) Zinc (% by mass) | 0.0005 | 0.0005 | 0.0005 | 0.0005 | 0.0005 | 0.0005 |
| | (E) Iron (% by mass) | 0.0001 | 0.0001 | 0.0001 | 0.0001 | 0.0001 | 0.0001 |
| | (G) Sodium (% by mass) | 0.005 | 0.005 | 0.005 | 0.005 | 0.005 | 0.021 |
| | (H) Potassium (% by mass) | 0.027 | 0.027 | 0.0013 | 0.0013 | 0.0013 | 0.0013 |
| | (I) Percentage of non-epi-bodies (% by mass) | 15.2 | 15.2 | 15.2 | 15.2 | 15.2 | 15.2 |
| | (J) Percentage of gallate bodies (% by mass) | 51.6 | 38.5 | 45.2 | 30.4 | 20.2 | 45.1 |
| | (K) Caffeine/catechins (A) (—) | 0.104 | 0.041 | 0.079 | 0.059 | 0.020 | 0.052 |
| | pH (25° C.) | 4.03 | 4.04 | 4.02 | 4.03 | 4.19 | 4.12 |
| | Sweetness degree | 5.8 | 5.8 | 5.8 | 5.8 | 5.8 | 5.8 |
| | Calorific value (Kcal/240 mL) | 35 | 35 | 35 | 35 | 35 | 35 |
| | Sweetness[1] | 1 | 1 | 1 | 1 | 1 | 1 |
| | Sourness[1] | 2 | 2 | 2 | 2 | 2 | 2 |
| | Bitterness[1] | 2 | 2 | 2 | 1 | 1 | 2 |
| | Taste after storage (37° C., 4 weeks)[1] | 3 | 2 | 3 | 2 | 2 | 3 |
| | Color tone after storage (37° C., 4 weeks)[2] | B | A | B | A | A | B |

TABLE 1-continued

|  | Example | Comparative Examples | | | | |
|---|---|---|---|---|---|---|
|  | 7 | 1 | 2 | 3 | 4 | 5 |
| Purified product of green tea extract containing non-polymer catechins (Production Examples) | 1 | 1 | 1 | 2 | 1 | 1 |
| Formulations Purified product of green tea extract containing non-polymer catechins (% by mass) | 0.85 | 0.85 | 0.53 | — | 0.85 | 0.85 |
| Concentrate of green tea extract (% by mass) | — | — | 0.22 | 0.61 | — | — |
| Concentrate of black tea extract (% by mass) | — | — | — | — | — | — |
| (B) Calcium lactate pentahydrate (% by mass) | 0.88 | — | — | 0.35 | 0.35 | 0.35 |
| (C) Magnesium lactate trihydrate (% by mass) | 0.01 | — | 0.01 | 0.01 | 0.01 | 0.01 |
| (D) Zinc sulfate (% by mass) | 0.00123 | — | 0.00123 | 0.00123 | 0.00123 | 0.00123 |
| (E) Iron gluconate (% by mass) | 0.00086 | — | 0.00086 | 0.00086 | 0.00086 | 0.00086 |
| Niacin (% by mass) VB3 | — | 0.00016 | 0.00016 | 0.00016 | 0.00016 | 0.00016 |
| (B) Calcium pantothenate (% by mass) VB5 | — | 0.00005 | 0.00005 | 0.00005 | 0.00005 | 0.00005 |
| Pyridoxy hydrochloride (% by mass) VB6 | — | 0.00001 | 0.00001 | 0.00001 | 0.00001 | 0.00001 |
| Inositol (% by mass) | 0.1 | — | — | — | — | — |
| (F) Anhydrous crystalline fructose (% by mass) | 3.66 | 3.66 | 3.66 | 3.66 | 3.66 | 3.66 |
| (F) Erythritol (% by mass) | 0.75 | 0.75 | 0.75 | 0.75 | 0.75 | 0.75 |
| Sodium L-ascorbate (% by mass) | 0.03 | 0.03 | 0.03 | 0.03 | 0.03 | 0.03 |
| Citric acid anhydride (% by mass) | 0.1 | 0.1 | — | 0.1 | 0.3 | 0.1 |
| Trisodium citrate (% by mass) | 0.061 | 0.061 | — | 0.061 | — | 0.80 |
| Green tea flavor (% by mass) | — | — | 0.1 | 0.1 | 0.1 | 0.1 |
| Black tea flavor (% by mass) | — | — | — | — | — | — |
| Lemon lime flavor (% by mass) | 0.1 | 0.1 | 0.1 | 0.1 | 0.1 | 0.1 |
| Deionized water (% by mass) | Balance | Balance | Balance | Balance | Balance | Balance |
| Total amount (% by mass) | 100 | 100 | 100 | 100 | 100 | 100 |
| (A) Non-polymer catechins (% by mass) | 0.127 | 0.127 | 0.151 | 0.127 | 0.127 | 0.127 |
| (B) Ca (% by mass) | 0.114 | 0[3] | 0[3] | 0.053 | 0.053 | 0.053 |
| Ca/non-polymer catechins (B)/(A) (—) | 0.900 | 0 | 0 | 0.417 | 0.417 | 0.417 |
| (C) Magnesium (% by mass) | 0.0011 | — | 0.0013 | 0.0021 | 0.0011 | 0.0011 |
| (D) Zinc (% by mass) | 0.0005 | — | 0.0005 | 0.0005 | 0.0005 | 0.0005 |
| (E) Iron (% by mass) | 0.0001 | — | 0.0001 | 0.0001 | 0.0001 | 0.0001 |
| (G) Sodium (% by mass) | 0.021 | 0.021 | 0.005 | 0.021 | 0.004 | 0.098 |
| (H) Potassium (% by mass) | 0.0013 | 0.0013 | 0.023 | 0.041 | 0.0013 | 0.0013 |
| (I) Percentage of non-epi-bodies (% by mass) | 15.2 | 15.2 | 15.2 | 15.2 | 15.2 | 38.9 |
| (J) Percentage of gallate bodies (% by mass) | 45.1 | 50.3 | 50.3 | 58.6 | 45.1 | 45.1 |
| (K) Caffeine/catechins (A) (—) | 0.052 | 0.052 | 0.104 | 0.052 | 0.052 | 0.052 |
| pH (25° C.) | 4.08 | 4.07 | 4.19 | 4.06 | 2.35 | 5.50 |
| Sweetness degree | 5.8 | 5.8 | 5.8 | 5.8 | 5.8 | 5.8 |
| Calorific value (Kcal/240 mL) | 35 | 35 | 35 | 35 | 35 | 35 |
| Sweetness[1] | 1 | 1 | 1 | 1 | 1 | 1 |
| Sourness[1] | 2 | 2 | 2 | 3 | 5 | 5 |
| Bitterness[1] | 1 | 4 | 4 | 5 | 3 | 3 |
| Taste after storage (37° C., 4 weeks)[1] | 3 | 5 | 5 | 5 | 5 | 5 |
| Color tone after storage (37° C., 4 weeks)[2] | B | D | B | D | D | D |

VB: Vitamin B
[1] 5-Stage taste evaluation, 1: excellent, 2: good, 3: average, 4: poor, 5: bad
[2] Color tone after storage, A: unchanged, B: slightly changed, C: changed, D: significantly changed
[3] Not detected As shown in Table 1, it is evident that the packaged beverage of the present invention contains non-polymer catechins, minerals and a sweetener, remains little changed in taste, can be reduced in bitterness, and is good in storage stability.

The invention claimed is:

1. A packaged beverage comprising:
(A) from 0.05 to 0.5% by mass of non-polymer catechins;
(B) from 0.01 to 0.12% by mass of calcium;
(C) from 0.00012 to 0.006% by mass of magnesium;
(D) from 0.000048 to 0.0024% by mass of zinc;
(E) from 0.00004 to 0.002% by mass of iron; and
(F) from 0.01 to 20% by mass of a sweetener,
wherein a content mass ratio [(B)/(A)] of the calcium (B) to the non-polymer catechins (A) is from 0.001 to 1.0; (J) a percentage of gallate bodies in the non-polymer catechins is from 5 to 55% by mass; and pH is from 2.5 to 5.1.

2. The packaged beverage according to claim 1, further comprising a purified product of green tea extract.

3. The packaged beverage according to claim 1, further comprising (G) from 0.001 to 0.5% by mass of sodium and/or (H) from 0.001 to 0.2% by mass of potassium.

4. The packaged beverage according to claim 1, wherein (I) a percentage of non-epi-bodies in the non-polymer catechins is from 5 to 25% by mass.

5. The packaged beverage according to claim 1, wherein a content mass ratio [(K)/(A)] of caffeine (K) to the non-polymer catechins (A) is from 0.0001 to 0.16.

6. The packaged beverage according to claim 1, which comprises as the sweetener one or more sweeteners selected from fructose, glucose, sucrose, glucofructose syrup and fructoglucose syrup.

7. The packaged beverage according to claim 1, which comprises as the sweetener a sugar alcohol.

8. The packaged beverage according to claim 1, which comprises as the sweetener an artificial sweetener.

9. The packaged beverage according to claim 1, further comprising at least one sour seasoning selected from ascorbic acid, citric acid, gluconic acid, succinic acid, tartaric acid, lactic acid, adipic acid, fumaric acid, malic acid, and salts thereof.

10. The packaged beverage according to claim 1, further comprising at least one vitamin B selected from inositol, thiamine hydrochloride, thiamine nitrate, riboflavin, riboflavin 5'-phosphate sodium, niacin, nicotinamide, calcium pantothenate, pyridoxy hydrochloride, cyanocobalamin, folic acid, and biotin.

11. The packaged beverage according to claim 1, which has a sweetness degree of at least 2 when sucrose is assumed to have a sweetness degree of 1.

12. The packaged beverage according to claim 1, which is a non-tea beverage.

13. The packaged beverage according to claim 1, which is a non-fermented tea beverage.

14. The packaged beverage according to claim 1, which is a fermented tea beverage.

15. The packaged beverage according to claim 1, which is a non-carbonated beverage.

16. The packaged beverage according to claim 1, which is a carbonated beverage.

17. The packaged beverage according to claim 1, which is a functional beverage.

18. The packaged beverage according to claim 1, which has a calorific value of not greater than 40 Kcal/240 mL.

\* \* \* \* \*